R. JONES.
INNER TUBE FOR TIRES.
APPLICATION FILED SEPT. 25, 1919.

1,389,362. Patented Aug. 30, 1921.

Inventor
Reece Jones,

Attorney

UNITED STATES PATENT OFFICE.

REECE JONES, OF TULSA, OKLAHOMA.

INNER TUBE FOR TIRES.

1,389,362.   Specification of Letters Patent.   Patented Aug. 30, 1921.

Application filed September 25, 1919. Serial No. 326,278.

*To all whom it may concern:*

Be it known that I, REECE JONES, a citizen of the United States of America, residing at Tulsa, in the county of Tulsa and State of Oklahoma, have invented new and useful Improvements in Inner Tubes for Tires, of which the following is a specification.

The object of the invention is to provide a self-healing inner tube for pneumatic tires adapted in the event of puncture to prevent the exhaust of air or reduction of internal pressure; and furthermore to provide a tube which is adapted for inflation and for maintaining the required internal pressure without the use of an auxiliary valve or valve tube ordinarily employed in this connection.

Further objects and advantages of the invention will appear in the course of the following description, it being understood that changes in form and proportion may be resorted to within the scope of the claims without departing from the principles involved.

The tube is designed with a view to placing the wall thereof when inflated in a condition of compression, transversely, as distinguished from placing the walls under a contractive strain as in the present practice. In other words it is the purpose to so construct the tube that when expanded or inflated to fill the casing or shoe of the tire the strain incident to the inflation or expansion will be a compressive strain tending to cause the particles of the wall of the tube to move toward each other rather than a strain tending to cause the particles of the wall to move away from each other, to the end that in the event of a puncture and the withdrawal of the puncturing object, instead of the opening thus formed tending to enlarge and thus permit the escape of air or pressure from the interior, the tendency will be to close the opening and retain the internal pressure, to the end that the tube may be self-healing and adapted to retain internal pressure regardless of puncture or similar injury.

To this end the tube is made cross-sectionally of an area which is in excess of that of the interior of the restraining element such as the casing or shoe in connection with which it is to be used, and correspondingly the tube is of a length which is in excess of that of the restraining element of the completed tire, its connecting ends telescoping. In so constructing and relating the parts, when the tube is inflated the internal pressure tends to compress or condense the walls thereof transversely, the telescoping ends permitting extension longitudinally.

Figure 2:
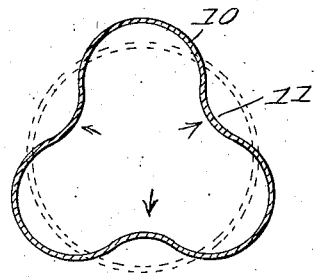
Fig. 2 is a transverse section showing in full lines the normal and in dotted lines the inflated position of the wall of the tube.
Figure 3:
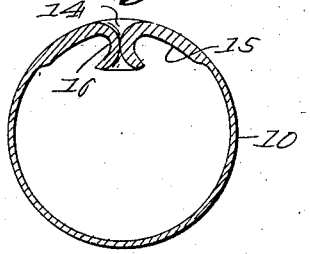
Fig. 3 is a view similar to Fig. 2 of the tube inflated, the section being taken in the plane of the inflation opening or passage as indicated by the line 3—3 of Fig. 1.
Figure 4:
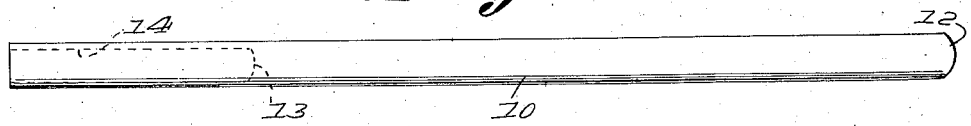
Fig. 4 is a side view of the tube extended or as seen prior to the nesting of the extremities thereof.

In practice I have found that an effective way of accomplishing this object so far as the transverse construction is concerned is to make the tube of cross-sectionally multi-foil form, a trefoil form being illustrated in Fig. 2, wherein alternately arranged exterior arches 10 and interior or reëntrant arches 11 are provided so that when the tube is arranged in the casing or sheath or other restraining element (which I have deemed it unnecessary to illustrate in the drawing) the pressure exerted as indicated by the darts in Fig. 2 will force the internal or reëntrant arches outward while the pressure of the restraining element will force the exterior arches inward, to produce a compression or condensation in the plane of the wall transversely of the tube.

Figure 1:
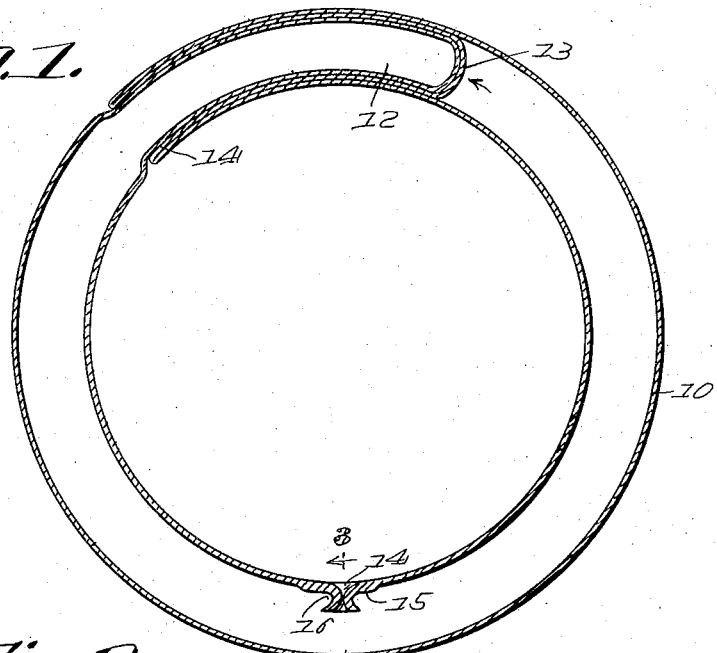
Figure 1 is a longitudinal sectional view of the tube as seen when inflated and in use.

To obtain circumferential variation the tube may be closed at both ends as shown at 12 and 13, one end being folded upon itself or drawn in to produce a seat or nest 14 for the reception of the other end of the tube so that in effect the ends of the tube are arranged in telescoping relation and when inflated the internal pressure exerted in the direction indicated by the arrow in Fig. 1 will tend to move the ends of the tube relative to the line of fold of the one end and thus extend the circumference or effective length of the tube to accord with that of the sheath or casing.

The same principle applied to the inflation opening may be utilized as a means of dispensing with the ordinary inflation valve and to this end the portion of the wall adjacent to the opening as shown at 14 should be thickened or reinforced as indicated at 15 and the portions of the thickened wall bounding the opening turned inward to form exteriorly concaved lips 16. The facing convexed surfaces of these lips lie in contact and while readily separable to permit of the introduction of an inflating tube such as that of a pump, the withdrawal of the inflating device will permit the lips to be forced toward each other by the internal pressure in the tube supplemented by the tendency of the walls of the tube to expand transversely under the compressive strain to which they are subjected by the inflation.

Obviously an inflation valve of the ordinary construction may be used in connection with a tube otherwise constructed as described herein, but as above noted, the use of the same is unnecessary in view of the tendency of a tube of this construction to close any puncture or opening in the wall thereof and thus automatically prevent the reduction of internal pressure.

What is claimed is:

1. An inflatable tube having an inflation opening bounded by inturned exteriorly concaved lips exposed to internal tube pressure.

2. An inflatable tube having an inflation opening bounded by inturned lips having convexed inner and concaved outer surfaces the latter being exposed to internal tube pressure.

3. An inflatable tube having an inflation opening formed in a reinforced area of the tube wall and bounded by internal lips exposed at their interior surfaces to internal tube pressure.

4. An inflatable inner tube having closed telescopically connected terminals relatively movable by internal air pressure to increase the circumference or effective length of the tube.

5. An inflatable inner tube having closed terminals telescopically connected and relatively movable by internal air pressure, one of the terminals being reversed or folded back on itself to provide a seat for the other terminal.

In testimony whereof I affix my signature.

REECE JONES.